June 18, 1963 J. RABINOW 3,093,908
VISCOUS FILM THICKNESS MEASURING GAGE
Filed Sept. 20, 1960

INVENTOR
Jacob Rabinow
BY Joseph A. Genovese
ATTORNEY

United States Patent Office 3,093,908
Patented June 18, 1963

3,093,908
VISCOUS FILM THICKNESS MEASURING GAGE
Jacob Rabinow, Takoma Park, Md., assignor to Rabinow Engineering Co., Inc., Rockville, Md.
Filed Sept. 20, 1960, Ser. No. 57,362
14 Claims. (Cl. 33—172)

This invention relates to measuring devices and particularly to instruments for measuring small thicknesses of viscous films on surfaces.

The principles of my invention may be used in measuring film thickness independent of the material of the film and reasons for the measurements. Therefore, I shall describe only one material and use, i.e. measuring the thickness of wet paint, but it is understood that my invention may be used for measuring the thickness of any viscous film and for any reason.

There are several classes of measuring devices for thin films. One class of device measures by contacting, without penetrating, the film. Such devices are exemplified by the J. Slepian Patent No. 2,554,271 having a vibratory system and an electrical network which measures the amount of damping in the system. The Slepian device, like all other prior devices in this class, cannot function properly unless the film is in the solid state. Another approach is disclosed in the G. Krouse Patent No. 2,625,585, where magnetic opposition to withdrawal of a feeler from the coated surface is detected, from which a thickness computation is made. Such a system not only relies on the solid state of the film but also the magnetic properties of the film and/or its supporting base. The S. Lipson Patent No. 2,507,529 may be considered as having the electromagnetic analogy of G. Krouse as far as my invention is concerned.

Another class has devices particularly designed to measure the thickness of viscous films. For instance, M. Enverard Patent No. 2,507,592 discloses a gage having calibrated wheels which are moved along a freshly painted surface. The paint thickness is then read directly from the calibrated wheels by noting the depth of penetration of the wheels. M. Lewis Patent No. 2,675,623 discloses another direct reading gage made of a tapered, calibrated scale which is pressed on the painted surface. Each of these gages produce a similar problem. They make line contact with the wet film and appreciably disfigure the painted surface. Further, differences in surface tension of different films and the ability of the film to chemically wet the gages may affect accuracy.

My invention is more closely concerned with the latter class of devices but it obviates the problem of appreciably marking the film coated surface. Its accuracy is independent of film surface tension and wetting. To accomplish this I rely on a vibratory reed system, and to my knowledge, no vibratory system has heretofore been used for measuring thicknesses of viscous films. I also use point contact (as opposed to line contact) with the film coated surface so that the damage to the film, if detectible at all, is minimal and in most cases self-correctible. Ordinary viscous films will flow to cover a point imperfection whereas a wide line imperfection has such a large area that it is not self-correcting.

I have observed that vibratory systems used for solid film thickness detection have been electrical, and in some cases operationally critical, e.g. E. Wigan Patent No. 2,073,913. An objective of my invention is to provide a viscous film measuring device which may be designed for electrical or mechanical (or both) operation of a vibratory system to detect initial contact with the film on which a film thickness measurement is based.

Another object is to provide a viscous film measuring device which makes only point contact with the film in more than one place regardless of the means used to compute, indicate or otherwise determine the film thickness.

A further object is to provide an easily used, portable film thickness gage which may be rapidly applied to a surface having a viscous film. In this connection, a feature of my invention is found in the coplanar, in-line arrangement of the film contacting points, making accuracy independent of tilt of the gage along the axis of the line containing the points.

The nature of my invention is best understood by considering how I measure viscous film thickness with one of my instruments. I simply press a pair of spaced points on the film surface, penetrating the film to the surface of the film supporting base. A vibratory reed is advanced toward the film until the reed initially contacts the film. Initial contact is detected by the damping of the reed as it first touches the film, and when this happens the advance of the reed is stopped. The distance between the line connecting the outer ends of the fixed points and the outer end of the reed is a measurement of the film thickness. This distance may be read directly from my instrument.

A feature of my invention is the method of stopping the advance of the reed toward the film. The stopping must be very prompt at the instant that the reed detects the film. Therefore, I use the initial contact of the reed with the film to stop the reed advance. This is achieved mechanically or electrically, and in either case, no physical brake is required.

Other objects and features will become evident in following the description of the illustrated forms of my invention.

Figure 1:
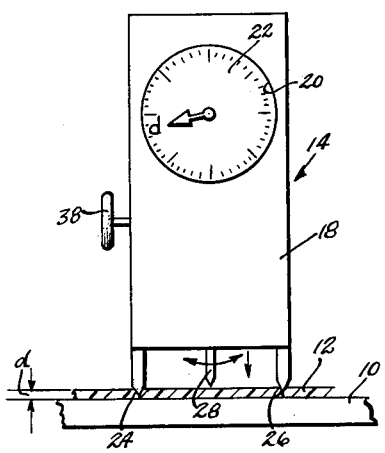
FIGURE 1 is an elevational view showing one of my gages being used.

FIGURE 1 shows a surface 10 on which film 12 of wet paint or other viscous substance has been applied. My portable gage 14 is shown measuring the thickness of film 12.

Figure 2:
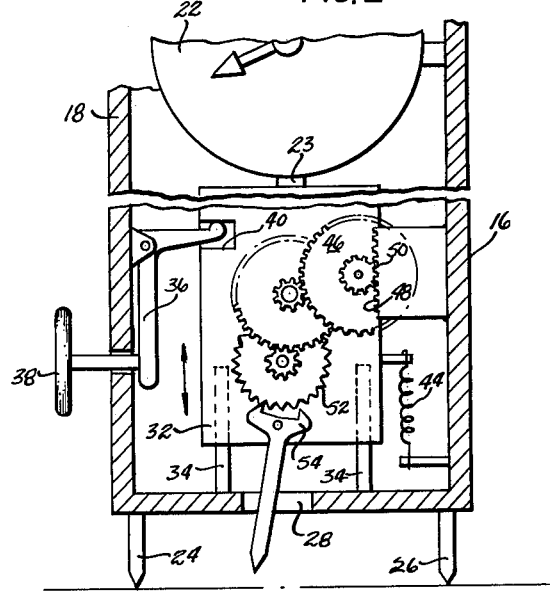
FIGURE 2 is a diagrammatic side sectional view of a mechanical form of my gage.

The gage illustrated in FIGURE 2 is wholly mechanical, and consists of a frame 16 in, or a part of, housing 18. The housing need not be shaped as shown, for example it may be contoured to fit the hand. Window opening 20 is in housing 18 for inspection of a conventional measuring device, e.g. the face of dial indicator 22 whose body is fixed to frame 16.

A reference is established by at least two spaced points 24 and 26 fixed to one end of frame 16. If desired three or more points may be used. A feeler made of a vibratory reed 28, is coplanar with points 24 and 26. The fixed points define a single line, and the reed is movable to allow the outer end to approach the reference line between points 24 and 26 as the reed is advanced toward film 12. The structure supporting the reed includes a carriage 32 suitably constrained, as by guide rails 34 fixed to frame 16 and engaged in slots in the body of carriage 32.

Carriage 32 is manually moved in one direction by operating bellcrank 36 which is pivoted to frame 16. Push button 38 has a shank in an opening in frame 16, and it contacts one end of crank 36. The other end of the crank is disposed in a slot 40 in carriage body 32. Resilient means, such as spring 44, oppose the movement of carriage 32 in one direction, and function as a motor to advance the carriage in the opposite direction. The spring is attached to carriage 32 and frame 16. The dial indicator actuation stem 23 bears against a part of carriage 32 so that indicator 22 functions as the carriage moves.

Reed 28 is vibrated during the up and down strokes of carriage 32 although the vibrations during the down stroke are the ones with which I am concerned. A speed multiplying gear train 46 is connected across the frame 16 and reed 28. The gear train relies on the motion of carriage 32 with respect to frame 16 for its torque. Gear train 46 has a rack 48 fixed to frame 16 and a pinion 50 carried by a shaft on carriage body 32. A series of enmeshed gears and pinions are interposed between the pinion shaft and a ratchet wheel 52 to rotate the latter. Escapement ratchet 54 is at one end of reed 28 and is mounted for oscillation by a spindle carried by body 32. As the carriage advances, the gear train operates, causing the ratchet wheel to rotate, and the ratchet 54 engaged with the ratchet wheel, to oscillate.

Reed 28 vibrates at high speed but with very low torque. Hence, a small resistance is all that is required to damp or stop the vibration of the reed. When the outer end of reed 28 contacts film 12 the reed 28 is damped or stopped thereby preventing the spring 44 from advancing carriage 32 any farther. The user may then read the film thickness measurement "$d$" (FIGURE 1) from the face of the indicator 22. To check the instrument the user can set the indicator reading to zero when the feeler reed point is in line with points 24 and 26.

Figure 3:
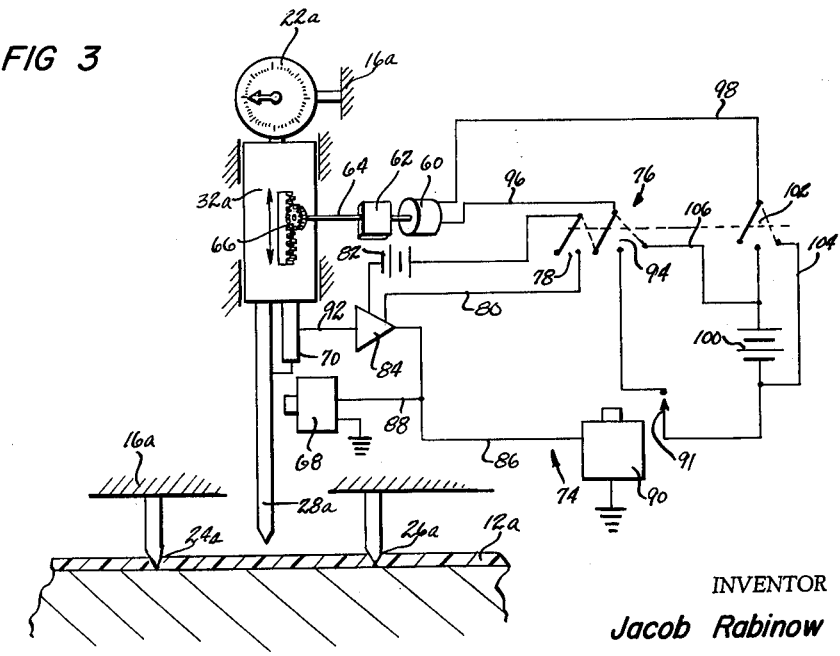
FIGURE 3 is a diagrammatic view partly in elevation and partly in perspective showing an electromechanical form of my invention.

FIGURE 3 shows an electromechanical form of my invention. The frame 16a, fixed points 24a and 26a, feeler reed 28a and dial indicator 22a are virtually the same as corresponding parts in FIGURE 2. The distinctions are in the means to advance the carriage 32a and the means to vibrate reed 28a attached to carriage 32a. Since these means are correlated, both are described together.

Carriage 32a is advanced by motor 60 which is mechanically coupled to carriage 32a as follows: Gear reducer 62 is operated by the motor, and it has a low speed output shaft 64. The shaft 64 is drivingly connected to carriage 32a by any suitable mechanism such as a rack and pinion assembly 66.

Reed 28a is vibrated by an electromagnetic oscillator driver 68 mounted on the frame adjacent to the reed. A transducer 70, for example a piezoelectric crystal attached to carriage 32a, is driven by vibrations of reed 28a so that there is an electrical output on line 92 so long as the reed vibrates. The combination of the pick-up 70, the amplifier 84, and the electromagnet 68 forms an oscillator circuit that drives the reed 28a.

Circuit network 74 is operatively connected with motor 60, driver 68 and transducer 70. It has a multisection switch 76 with section 78 in line 80 extending from one side of electrical source 82 to amplifier 84. The other side of the source is also connected to the amplifier. Thus, amplifier 84 is energized when switch section 78 is closed, and the amplifier output is fed over lines 86 and 88 to driver 68. Line 86 is also connected to an A.C. relay 90 which does not operate until there is an A.C. component on line 86. This is obtained from the output of transducer 70 fed to amplifier 84 over line 92. Accordingly, the A.C. component required to operate relay 90 exists only when reed 28a vibrates.

Section 94 of switch 76 is in line 96 attached to motor 60 and the switch section 91 of relay 90. Conductor 98 is connected to motor 60, source 100 and then to relay switch section 91. For the moment, I am omitting switch section 102 of switch 76 and jumpers 104 and 106. We have seen that relay switch section 91 closes when the reed 28a is driven upon closing of switch section 78. Switch section 94 is simultaneously closed thereby completing the circuit of motor 60 which includes lines 96 and 98 together with source 100. Consequently, carriage 32a advances when switch 76 is closed. At the instant that the feeler reed 28a contacts the viscous film 12a, reed 28a is damped resulting in stopping the action of the oscillating circuit. As described above, the A.C. component on line 86 necessary to operate relay 90 no longer exists, whereby relay switch section 91 returns to its normally open position. This opens the circuit of motor 60 causing the carriage to stop its advance. Film thickness "$d$" may then be directly read from dial indicator 22a.

Carriage 32a may be returned by manual means similar to crank 36. Alternatively, switch 76 may be provided with switch section 102 which closes when sections 78 and 94 are closed, and which connects to jumper 104 when the switch 76 is moved farther, i.e. to a third position (shown in dotted lines) at which section 78 is open and section 94 connects to the opposite side of battery source 100 by way of line 106. The effect of switch sections 94 and 102 in the third position is to switch the polarity of the source for motor 60, causing it to reverse and withdraw carriage 30a to the starting position (FIGURE 3).

Although I have shown two forms of my invention, the principles may be practiced in numerous embodiments. Therefore, all variations and modifications within the scope of the claims may be resorted to.

I claim:

1. A gage for measuring the thickness of viscous film on a surface, said gage comprising a frame having coplanar contact points to penetrate the film and engage the surface, a reed, means connected to said frame for moving said reed toward the film, means for oscillating said reed at right angles to the movement, and means responsive to the damping effect of the viscous film when the reed is damped by initially contacting the film to stop said reed oscillating means and also stop said reed moving means so that the distance between the part of the reed touching the film and the plane of said points is the measure of film thickness.

2. The gage of claim 1 and means to measure said distance between said reed part, and the plane of said points.

3. The gage of claim 2 wherein said reed moving means include a motor.

4. In a gage to directly measure the thickness of a wet viscous film on a surface, said gage relying on essentially point contact to eliminate permanent disfiguring of the film surface, the improvement comprising a vibratory member point, reference means to engage the surface, controllable means to move the vibratory member against the wet film, means responsive to a change in member vibration to detect the initial contact of the member with and wet film and stop said member moving means so that a measurement may be taken between said reference means and the part of the member making initial contact with the wet film.

5. A gage for a film of wet paint on a surface comprising reference means to penetrate the paint and engage the surface, a vibratory reed means to vibrate said reed, means for advancing said reed toward said reference means, the vibratory motion of said reed being in such a direction that the end of the reed moves in an arc with a portion of the arc parallel to said film, and means responsive to the change of vibration amplitude of said reed caused by reed damping for stopping said reed vibrating means, and means for detecting the precise point in the advance of said reed that said reed touches the wet paint, so that a measurement between said reference means and the part of the reed touching the paint film may be taken.

6. The gage of claim 5 wherein said reference means are points so that only very small indentations are made in the paint film whereby they will be self-corrected by the wet paint flow after removal of said reference means.

7. The gage of claim 6 and an indicator to display said measurement, said reed advancing means including a motor, said detecting means including an oscillator driver for said reed, and a circuit network actuating said driver.

8. The gage of claim 7 and means in said circuit network to control said motor.

9. The gage of claim 3 wherein said motor is mechanical.

10. The gage of claim 3 wherein said motor is electrical.

11. In a gage for measuring the thickness of viscous film on a surface, a frame having two spaced, in-line, reference points to penetrate the film and engage the surface, a feeler, means for moving said feeler toward said film, means for vibrating said feeler at right angles to its movement by said moving means, means responsive to the damping effect of the viscous film when the end of said feeler contacts the film to detect the initial contact of the feeler with the film, whereby the distance between the part of the feeler touching the film and the line defined by said points is the measure of film thickness, said feeler end being in the same line as said fixed points when all three contact a flat surface so that the accuracy of the gage is substantially uneffected by tilting the gage about said points.

12. An instrument to measure the thickness of a film on a surface comprising a frame, a pair of points secured to said frame and adapted to penetrate the film and engage the surface, a feeler, means connected with said feeler to move said feeler toward the film, detection means to indicate when said feeler contacts the film so that when said feeler contacts the film the distance measured perpendicular to said surface between the end of the feeler and the line connecting the extremities of said points is equal to the thickness of said film, said points being substantially in-line with said end of said feeler.

13. The instrument of claim 12 wherein the film is viscous, and means for vibrating said feeler so that said feeler end contacting the viscous film is detectible by damping of the feeler.

14. The instrument of claim 12 wherein said means to move said feeler discontinue moving said feeler in response to initial contact of said feeler with the film.

References Cited in the file of this patent
UNITED STATES PATENTS

| | | |
|---|---|---|
| 1,927,821 | Abbott | Sept. 26, 1933 |
| 2,808,581 | Findlay | Oct. 1, 1957 |

FOREIGN PATENTS

| | | |
|---|---|---|
| 817,631 | Great Britain | Aug. 6, 1959 |